(12) United States Patent
McDermid

(10) Patent No.: US 11,281,309 B2
(45) Date of Patent: Mar. 22, 2022

(54) HAND-HELD HUMAN INPUT DEVICE FOR A COMPUTER

(71) Applicant: William James McDermid, Niwot, CO (US)

(72) Inventor: William James McDermid, Niwot, CO (US)

( * ) Notice: Subject to any disclaimer, the term of this patent is extended or adjusted under 35 U.S.C. 154(b) by 0 days.

(21) Appl. No.: 17/139,767

(22) Filed: Dec. 31, 2020

(65) Prior Publication Data

US 2021/0349551 A1 Nov. 11, 2021

Related U.S. Application Data

(60) Provisional application No. 63/021,793, filed on May 8, 2020.

(51) Int. Cl.
*G06F 3/0346* (2013.01)
*G06F 3/041* (2006.01)

(52) U.S. Cl.
CPC .......... *G06F 3/0346* (2013.01); *G06F 3/0416* (2013.01)

(58) Field of Classification Search
CPC .............................. G06F 3/0345; G06F 3/0416
See application file for complete search history.

(56) References Cited

U.S. PATENT DOCUMENTS

| | | | | |
|---|---|---|---|---|
| 2006/0164392 A1* | 7/2006 | Mao | ...................... | G06F 3/0213 345/163 |
| 2010/0085308 A1* | 4/2010 | Jarczyk | ................. | G06F 3/0221 345/168 |
| 2011/0134034 A1* | 6/2011 | Daniel | .................... | A63F 13/24 345/158 |
| 2012/0044147 A1* | 2/2012 | Roka | .................. | H04M 1/0247 345/169 |
| 2012/0075125 A1* | 3/2012 | Miwa | .................... | G06F 1/1669 341/22 |
| 2012/0113034 A1* | 5/2012 | McDermid | ........... | G06F 1/1632 345/173 |
| 2015/0103007 A1* | 4/2015 | Forshaug | ............ | G06F 3/03543 345/163 |
| 2016/0048217 A1* | 2/2016 | Sakita | .................... | H01H 13/84 345/169 |
| 2016/0116992 A1* | 4/2016 | McDermid | ............. | G06F 1/169 345/169 |
| 2019/0176033 A1* | 6/2019 | Ironmonger | .......... | A63F 13/211 |

* cited by examiner

*Primary Examiner* — Ryan A Lubit

(57) ABSTRACT

A method and apparatus are provided for user input to a computer. The apparatus consists of movable paddles with multiple axes of motion. The paddles are shaped to include means for holding the device while keeping a user's fingers and thumbs free to activate touch sensitive areas on the paddles. Both the positions of the paddles and the location of touches are used to determine the input codes sent to the computer.

21 Claims, 9 Drawing Sheets

HAND-HELD HUMAN INPUT DEVICE FOR A COMPUTER

CROSS REFERENCE TO RELATED APPLICATIONS

This non-provisional application claims priority to U.S. provisional application 63/021,793 filed on May 8, 2020, which is incorporated herein by reference.

This non-provisional application is also related to U.S. Pat. No. 8,810,536 filed by the same inventor on Nov. 2, 2011, which is incorporated herein by reference.

This non-provisional application is also related to U.S. patent application Ser. No. 14/526,369 filed by the same inventor on Jun. 7, 2016, which is incorporated herein by reference.

BACKGROUND OF THE INVENTION

1. Field of the Invention

This invention relates to a method and apparatus for human input to and control of a paired computer.

2. Statement of the Problem

A common method for entering data into a computer requires two devices: a keyboard and a separate pointing device. This requires users to remove their hands from one device to use the other, thereby slowing down the human-computer interaction. It also requires the user to see the input devices to reposition their hands and fingers as they move between them. Furthermore, to be used effectively, these devices often require a horizontal surface to rest upon which limits their viability in mobile applications. A hand-held computer input device with touch sensitive regions attached to moveable grips is one attempt to address these limitations. In a pointer mode, the movement of the grips can control a cursor, while in a typing mode, the position of the grips can be used to set the current definition for the touch-sensitive areas under a user's fingers. The current generation of these devices have a single axis of movement for the grips which limits their ergonomic adaptability in typing mode and their effectiveness in pointing mode. The limitation on movement is necessary in part because the device is held by pressing in of the hands to free the fingers from gripping so they can be used for typing.

SUMMARY OF THE SOLUTION

The present invention solves the above and other problems with an apparatus that allow a user's hands to precisely control paddles with multiple axes of movement without having to grip the apparatus thereby keeping fingers and thumbs free for pressing keys on the paddles to type. The keys on the apparatus are located under each of the fingers and thumbs so the user need never look at the apparatus when pointing or typing.

ASPECTS

An aspect of the invention is how it is comprised of left and right paddles connected by a tie bar allowing the apparatus to be held by pressing it between a user's hands. The paddles are shaped to press into the user's palm on a line that runs along the metacarpal-phalangeal joints and extends to pass between the proximal phalanges of the user's index finger and thumb.

Another aspect of the invention is how each paddle is connected to the tie bar via 2-axis pivots. These pivots are pressed into the wells in the center of the user's palms when the apparatus is being held. One pivot axis allows the paddles to rock down when pressed by the metacarpal-phalangeal joint of the index finger and rock up when pressed by the metacarpal-phalangeal joint of the pinky finger. The other pivot axis allows the paddles to roll out when pressed by the proximal phalange of the thumb and roll in when pressed by the proximal phalange of the index finger.

Another aspect of the invention is how each paddle has five key switches positioned under the user's finger tips and thumbs such that the keys are not unintentionally pressed while the paddles are manipulated to rock and to roll responsive to hand movements.

Preferably the finger keys are activated by pressing into the back of a paddle and the thumb key is activated by pressing down on the paddle.

Another aspect of the invention is how a paddle can be split into a palm part and a finger part such that the palm and finger parts can be slid in and out relative to one another to accommodate smaller and larger hands, respectively.

Another aspect of the invention is how the finger part can be pitched in relative to the palm part to position the keys to a user's preference.

Another aspect of the invention is how it has a force sensor in the tie bar to measure the force being applied when the device is being held and pressed between the user's hands.

Preferably, the amount of pressure being applied selects between multiple modes of the invention such as a pointing mode and a typing mode, and a calibration mode.

Another aspect of the invention is how when in pointing mode the movements of the paddles can manipulate the movement of a cursor much like a computer mouse.

Preferably the cursor moves left when the left paddle rolls out and/or the right paddle rolls in, and the cursor moves right when the left paddles rolls in and/or the right paddle rolls out.

Preferably the cursor moves up when the left and/or right paddle(s) rock up and the cursor moves down when the left and/or right paddle(s) rock down.

Another aspect of the invention is how when in typing mode the positions of the paddles can be used to select a set of the keys to assign to the key switches on the paddles so all the keys of a computer keyboard can be reported through the 10 keys of the apparatus.

Preferably the current roll position of a paddle selects among the rows of a keyboard and the current rock position of a paddle selects among the keys within a row.

Another aspect of the invention is how when in calibration mode the current rock and roll position of the paddles are set as the neutral "home" position.

Preferably the cursor is in the center when in the home position while in pointing mode.

Preferably the a-s-d-f keys are under the left fingers and the j-k-l-; keys are under the right fingers when in the home position while in typing mode.

Another aspect of the invention is how an accelerometer sensor in the apparatus reports movements of the whole apparatus and its orientation relative to the earth.

Another aspect of the invention is how a hinge in the middle of the tie bar allows the apparatus to be folded in half when not in use for storage and transport.

Preferably the palm-finger pitch is spring loaded so the paddles lay flat when the apparatus is folded in half.

Another aspect of the invention is how it contains electronics comprised of power sources, sensors, controllers, and radios to determine the position of the paddles, the state of the key switches, and read the embedded sensors to report inputs to a paired computer via a communication link.

Preferably each paddle contains electronics that require only two wires to connect them to simplify getting through the pivots at the ends and the hinge in the middle of the tie bar.

Preferably one of the signals is a ground connection and the other signal is time multiplexed between a power connection, a digital communication signal, and an analog signal output from the force sensor.

Another aspect of the invention is a means for mounting a digital device such as a smart phone or tablet computer to the tie bar.

Another aspect of the invention is how a diagram of keys can be shown on the display of a connected digital device where the currently active keys responsive to the paddle position and hold pressure are highlighted.

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-9 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1A:
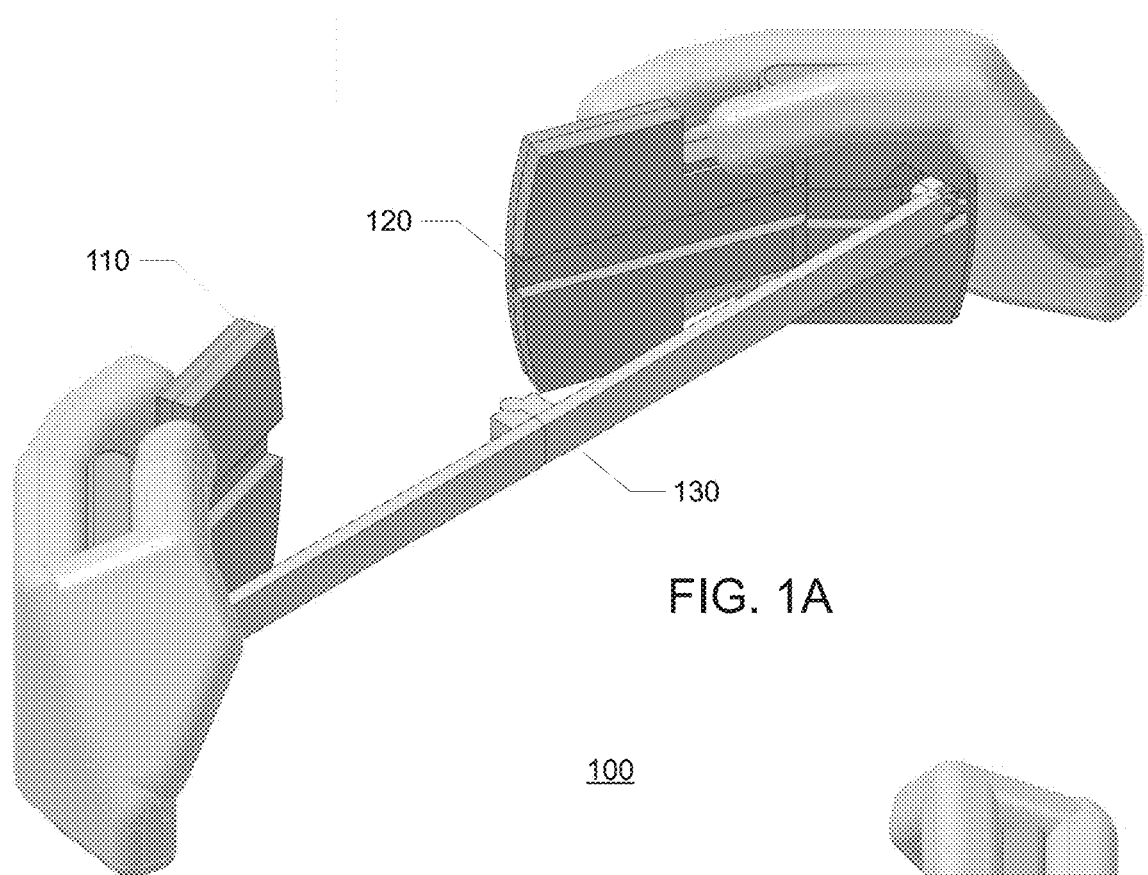
FIGS. 1A and 1B are isometric views of the apparatus being held in the home position.
Figure 1B:
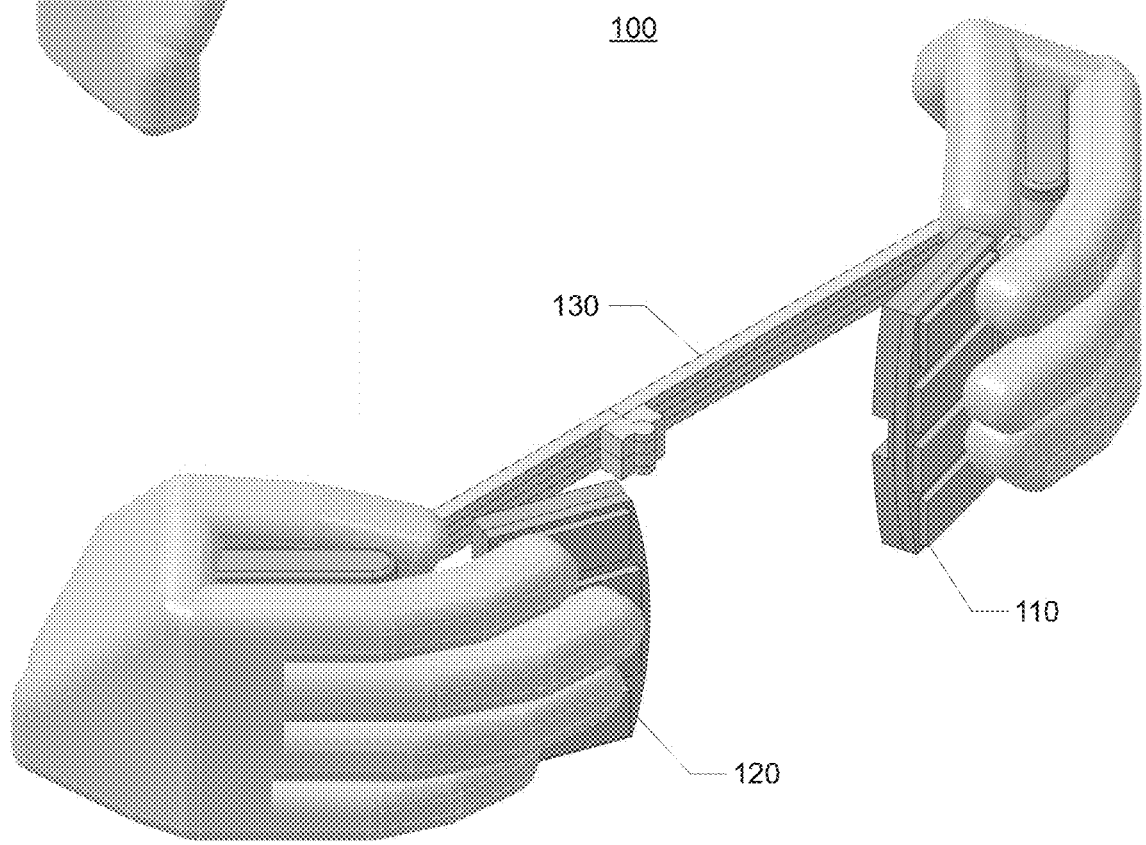

FIG. 1 shows how apparatus 100 is held by a user by pressing it between their hands. Paddle 110 is pressed into the right hand and paddle 120 is pressed into the left hand. The paddles are connected to one another by tie bar 130.

Figure 2A:
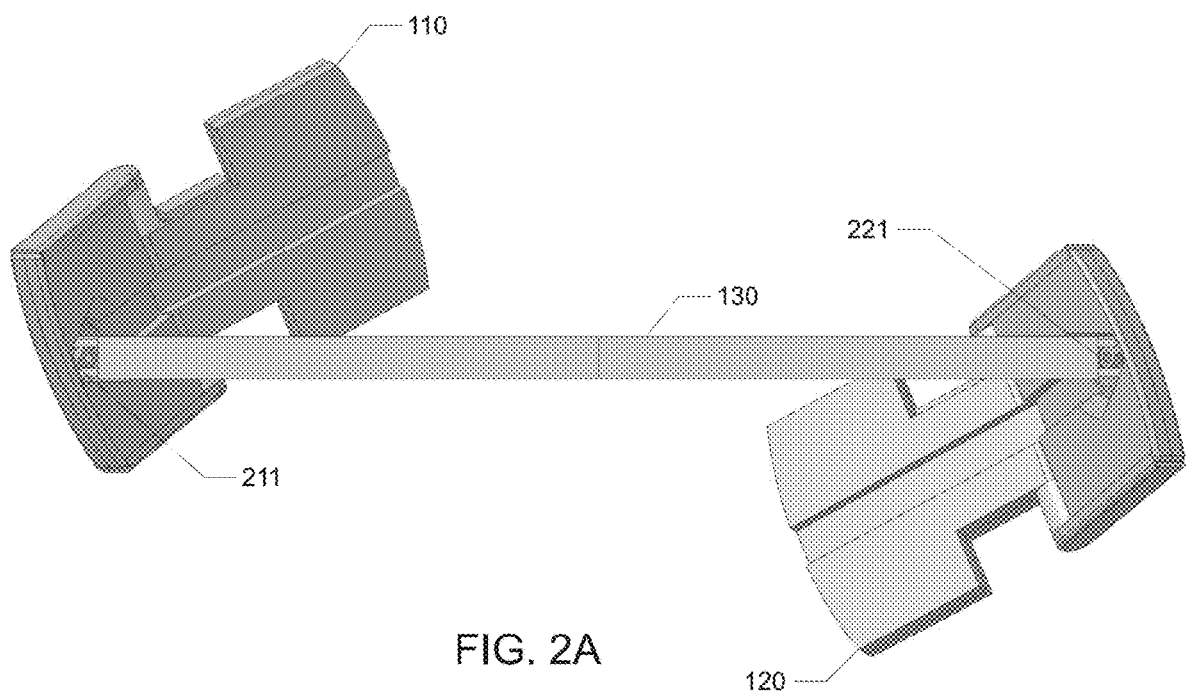
FIG. 2A is a front view of the apparatus with the left paddle rocked up and the right paddle rocked down.
Figure 2B:
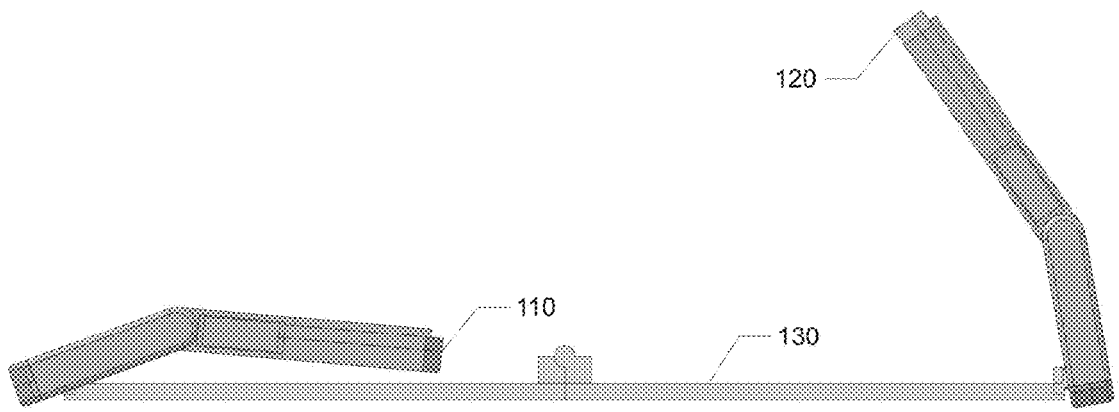
FIG. 2B is a top view of the apparatus with the left paddle rolled in and the right paddle rolled out.

FIG. 2A shows paddle 110 connected to tie bar 130 via pivot 211 and paddle 120 connected to tie bar 130 via pivot 221. Pivots 211 and 221 allow motion around 2 axes. FIG. 2A demonstrates one of the axes of motion with paddle 110 rocking up and paddle 120 rocking down. FIG. 2B demonstrates the other axes of motion with paddle 110 rolled in and paddle 120 rolled out.

Figure 3:
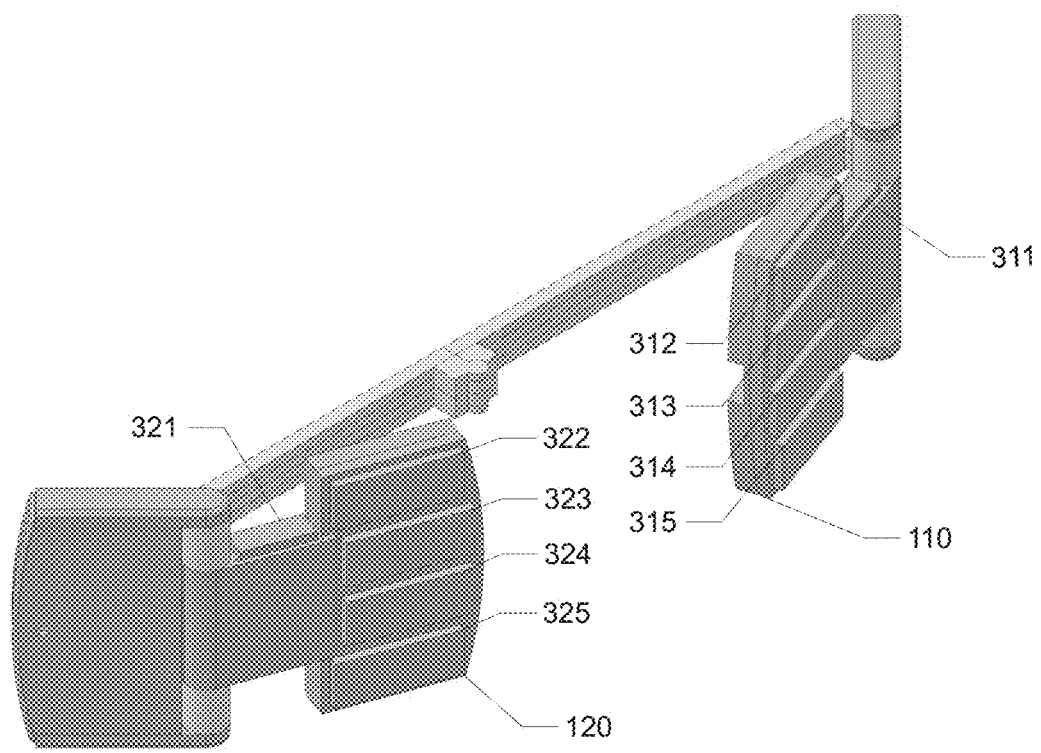
FIG. 3 is an isometric back view of the apparatus showing key locations.

FIG. 3 is an isometric back view showing the location of the keys on apparatus 100. Keys 311 through 315 on paddle 110 are for the thumb, index finger, middle finger, ring finger and pinky finger of the right hand, respectively. Keys 321 through 325 on paddle 120 are for the thumb, index finger, middle finger, ring finger and pinky finger of the left hand, respectively.

Figure 4:
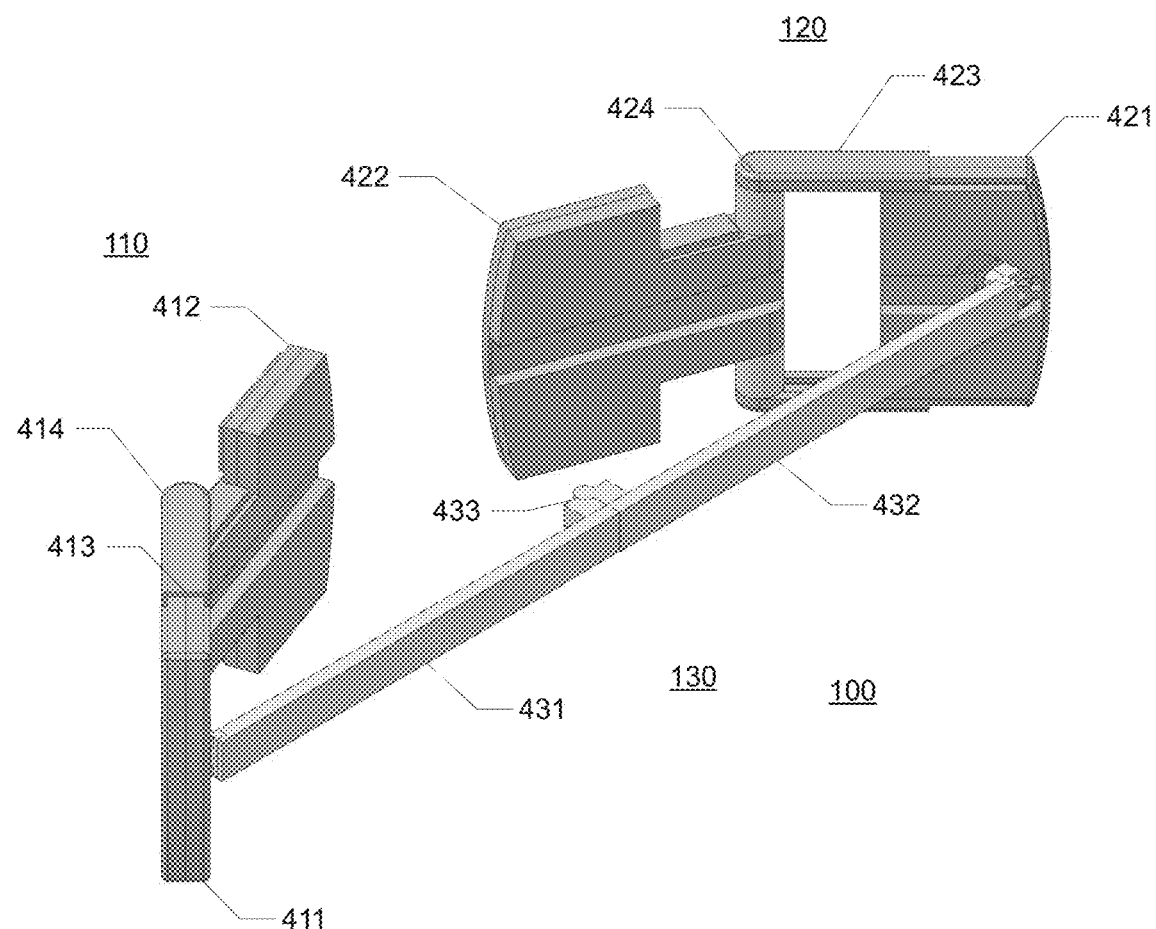
FIG. 4 is an isometric front view of the apparatus with the finger sections of the paddle slid away from the palm sections of the paddle.

FIG. 4 shows how paddle 110 is comprised of palm part 411 and finger part 412 connected by slide 413 and hinge 414. Similarly, paddle 120 is comprised of palm part 421 and finger part 422 connected by slide 423 and hinge 424. The slides allow the finger parts to be extended relative to the palm parts to adjust the invention to fit a user's hands. The hinges allow the finger parts to pitch relative to the palm parts to position the finger keys to fit a user's hands.

Tie bar 130 is comprised of left half 431 and right half 432 connected via hinge 433.

Figure 5:
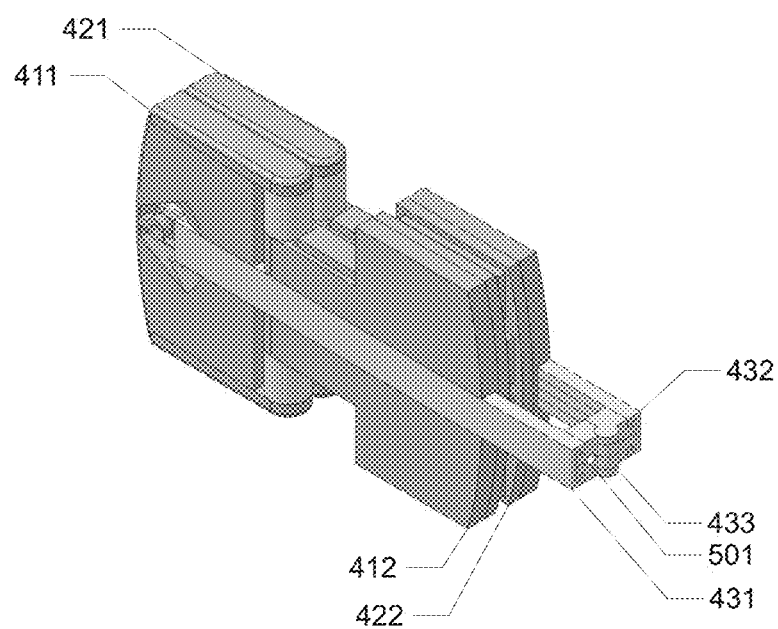
FIG. 5 is an isometric view of the apparatus in a folded mode.

FIG. 5 shows apparatus 100 folded in half at hinge 433. Hinge 414 allows finger part 412 to align with palm part 411 and hinge 424 allows finger part 422 to align with 421 allowing apparatus 100 to close tightly for storage or transport.

Actuator 501 is coupled to a force sensor embedded in hinge 433. When apparatus 100 is unfolded, tie bar half 432 presses on actuator 501 so the force sensor can measure the amount of pressure being exerted by the user holding the apparatus.

Figure 6A:
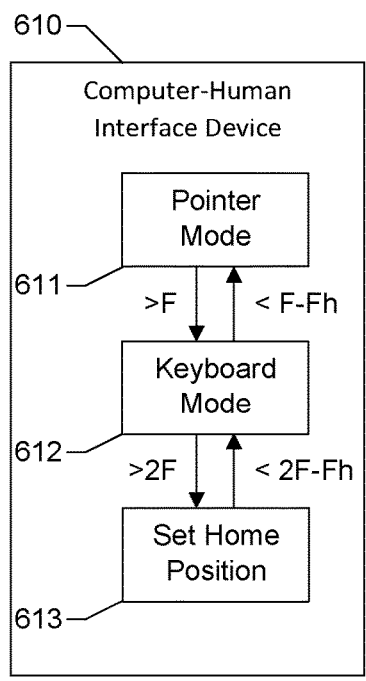
FIG. 6A is a step diagram showing how the invention moves between modes in a computer-human interface device usage scenario.

FIG. 6A shows scenario 610 in which the invention is used as an input peripheral to a connected computer. The modes 611, 612, and 613 are selected based on the amount of pressure exerted by the user holding apparatus 100. When a force greater than F is applied, the mode transitions from pointer mode 611 to keyboard mode 612. Force Fh is the amount of hysteresis for returning to mode 611. A force greater than F2 causes the mode to transition to mode 613. In this example, mode 613 sets the current rock position and roll position of the paddles as the user's selected home position as a reference base for modes 611 and 612.

Figure 6B:
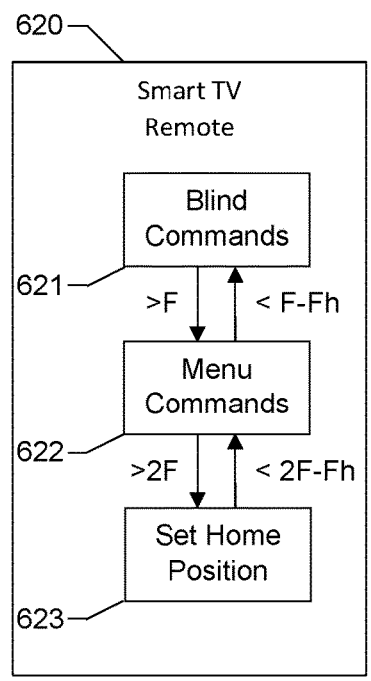
FIG. 6B is a step diagram showing how the invention moves between modes in a smart TV remote usage scenario.

FIG. 6B shows usage scenario 620 in which the invention is used as a remote controller for a smart TV. The modes 621, 622, and 623 are selected in the same manner as scenario 610.

Figure 6C:
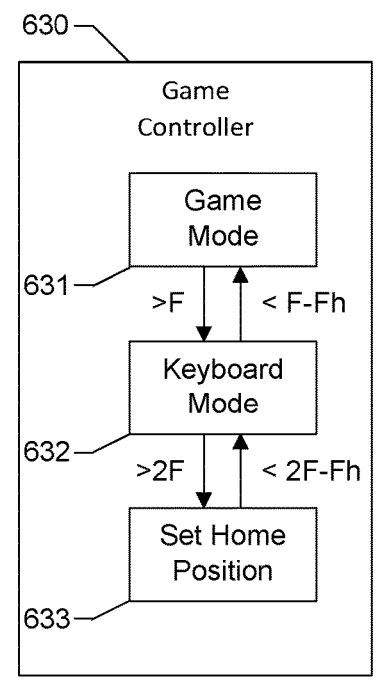
FIG. 6C is a step diagram showing how the invention moves between modes in a game controller usage scenario.

FIG. 6C shows usage scenario 630 in which the invention is used as a video game controller. The modes 631, 632, and 633 are selected in the same manner as scenario 610.

Figure 7:
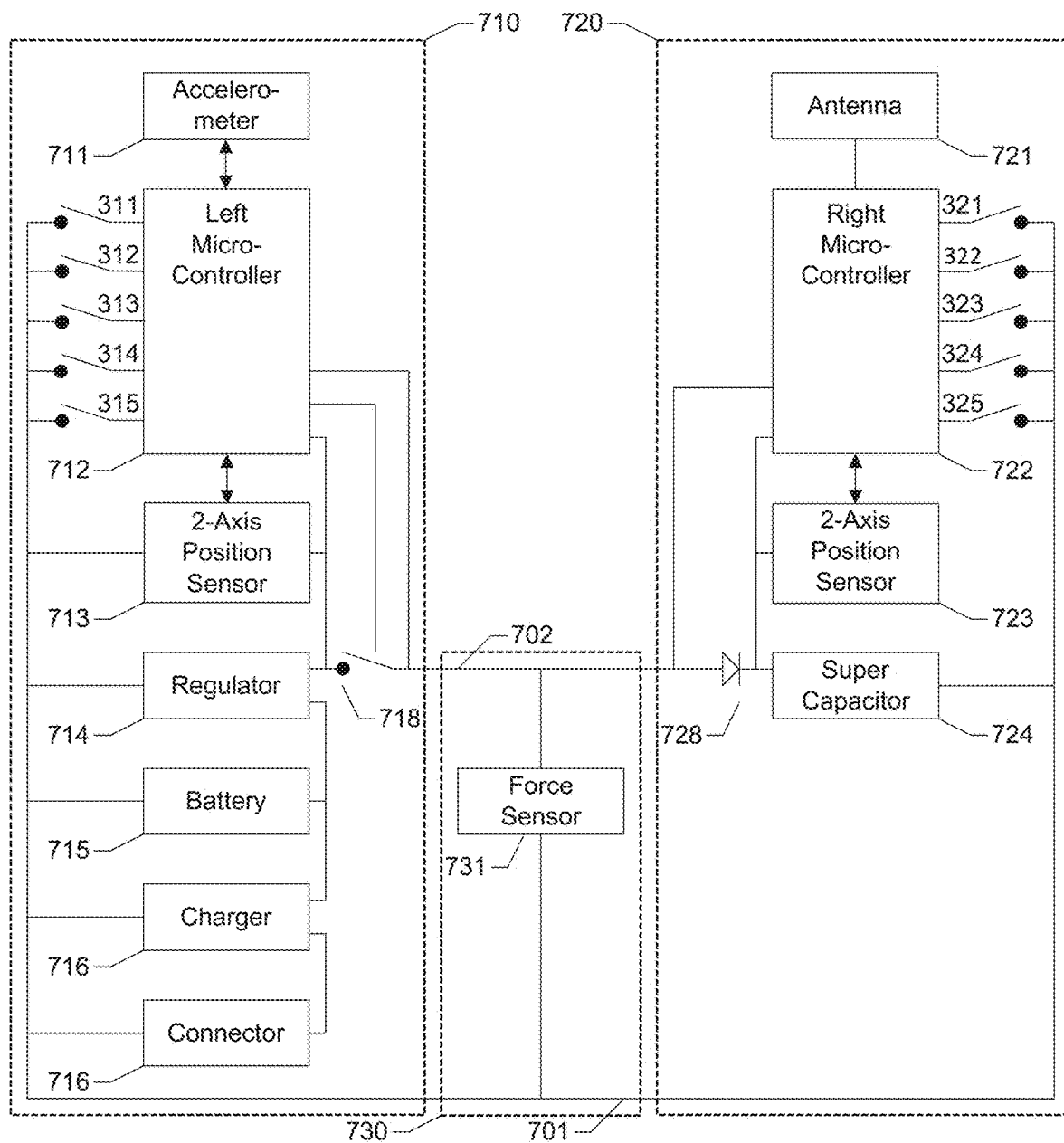
FIG. 7 is a block diagram of the electronics of the apparatus.

FIG. 7 is a block diagram of the electronics embedded in apparatus 100. Block 710 is the electronics in paddle 110, block 720 is the electronics embedded in paddle 120, and block 730 is the electronics embedded in tie bar 130. The electronics are distributed through the blocks so only two connections 701 and 702 are required between them.

The power for the electronics is provided by battery 715. It is charged via charger 716 which is in turn connected to external power via connector 717. The battery/charger voltage is regulated by 714. Closing switch 718 delivers power to supper capacitor 724 in block 120 via connection 702 through diode 728. Super capacitor 724 continues to deliver power to the electronics in block 720 when switch 718 is opened so connection 702 can be used for communication between micro-controllers 712 and 722, and for reading force sensor 731.

Micro-controller 712 in block 710 monitors the key switches 311 through 315 in paddle 110. 712 also monitors 2-axis position sensor 713 to determine the current rock and roll positions of paddle 110 relative to tie bar 130. 712 monitors accelerometer 711 to determine the position of paddle 110 relative to earth. It can then determine the orientation of tie bar 130 relative to earth by applying the paddle to tie bar orientation previously determined. 712 controls switch 718. When open, 712 can read the status of force sensor 731 in tie bar 130. 712 then uses connection 702 to communicate the status of the key switches and sensors to micro-controller 722.

Micro-controller 722 in block 720 monitors the key switches 321 through 325 in paddle 120. 722 also monitors 2-axis position sensor 723 to determine the current rock and roll positions of paddle 120 relative to tie bar 130. 722 combines these data with the data received from 712 and communicates to a paired digital device via a wireless connection via antenna 721.

Figure 8:
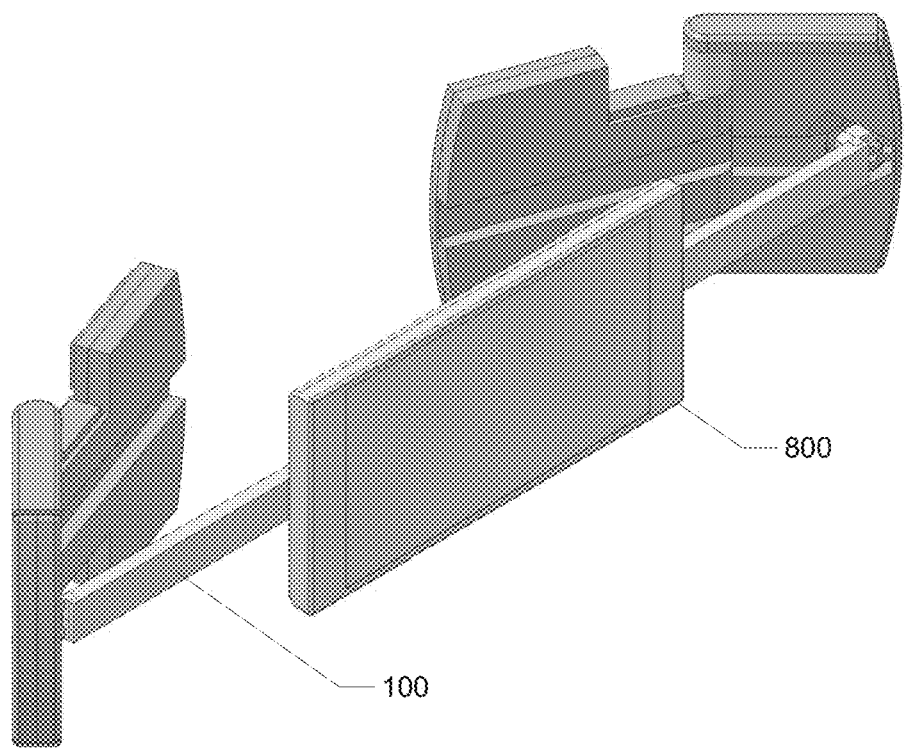
FIG. 8 is an isometric view of the apparatus with a smart phone mounted on it.

FIG. 8 shows a possible usage scenario where a paired smart phone 800 is mounted to apparatus 100.

Figure 9A:
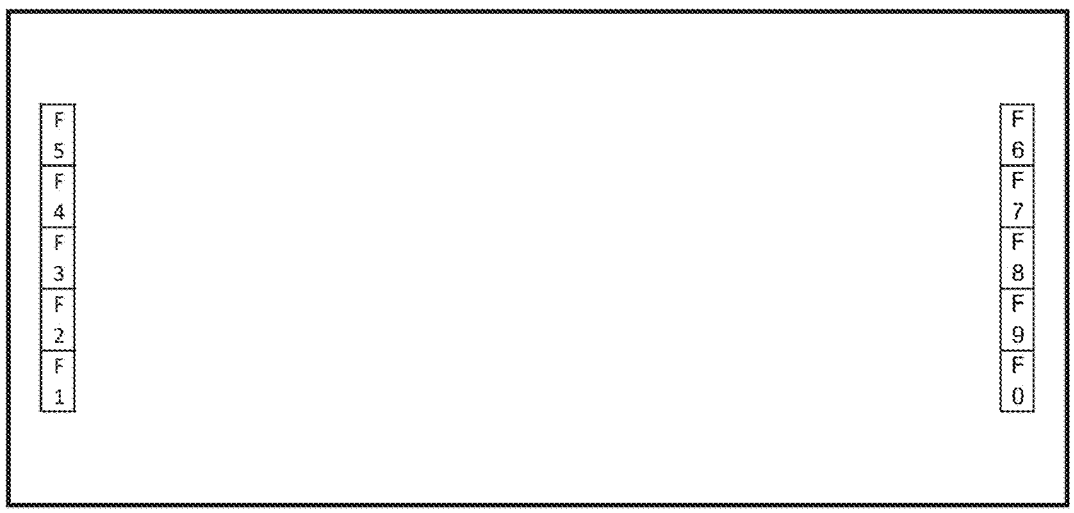
FIG. 9A shows an example of key maps that might be shown on the display of a connected digital device when the invention is operating in a pointer mode.
Figure 9B:
FIG. 9B shows an example of key maps that might be shown on the display of a connected digital device when the invention is operating in a keyboard mode with the paddles in one position.
Figure 9C:
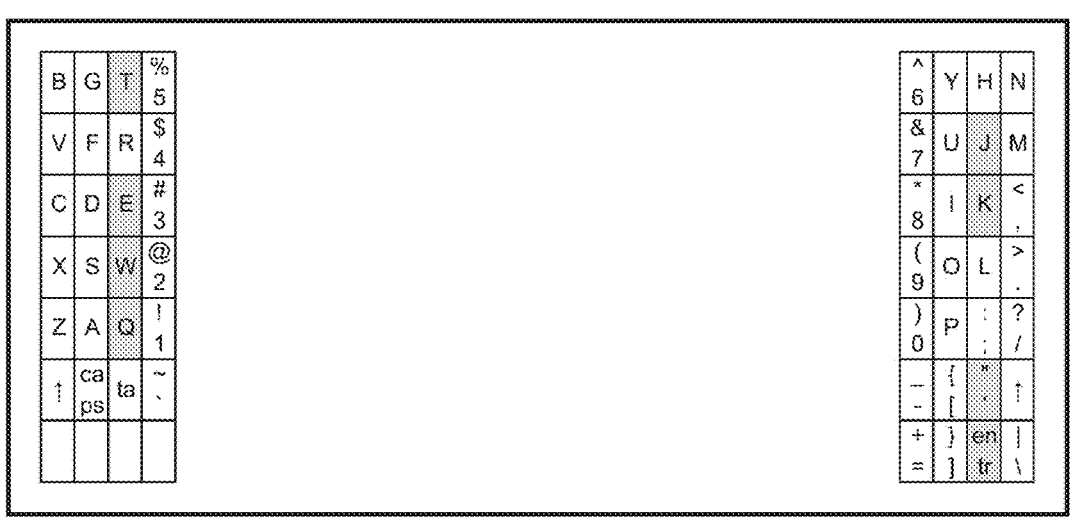
FIG. 9C shows an example of key maps that might be shown on the display of a connected digital device when the invention is operating in a keyboard mode with the paddles in a second position.

FIG. 9A, FIG. 9B, and FIG. 9C show possible images that application software running on paired device 800 could display to the user using the invention. FIG. 9A is an example of what might be displayed when in pointer mode 611. The application code would replace the ten labels F0-F9 with menu icons specific to the application that the user selects through the ten key switches.

FIG. 9B is an example of what might be displayed when in keyboard mode 612 or 632 with the paddles in the home position. The shaded boxes highlight the current key codes that are returned when the corresponding key switch is pressed. The boxes that are not highlighted provides information to the user on how to position the paddles to get to specific key codes.

FIG. 9C shows the highlighted keys when left paddle 110 is rolled in one level and rocked up, and right paddle 120 remains on the home column and rocked down.

By displaying key maps and having one key positioned under each finger, a user need never look at the apparatus when using it as an input device. This is particularly useful in scenario 610 or 630 when the display of the paired digital device is a pair of virtual reality goggles when external devices are not visible. It is also useful in TV remote scenario 620 when in a darkened room.

I claim:

1. An apparatus comprising:
    a left paddle and a right paddle wherein the left and right paddles are shaped to press into the palm on a line that runs along the metacarpal-phalangeal joints and extends to pass between the proximal phalanges of the index finger and thumb;
    a tie bar having a first 2-axis pivot and a second 2-axis pivot, wherein the left paddle is connected to the tie bar via the first 2-axis pivot and the right paddle is connected to the tie bar via the second 2-axis pivot, wherein each of the 2-axis pivots are configured to press into the wells in a center of a user's palm;
    a first pivot axis of the left and right 2-axis pivots allows the left and right paddles to rock down when pressed by the palm near the metacarpal-phalangeal joint of the index finger and rock up when pressed by the palm near the metacarpal-phalangeal joint of the pinky finger;
    a second pivot axis of the left and right 2-axis pivots allows the left and right paddles to roll out when pressed by the side of the thumb and roll in when pressed by the palm;
    and touch sensitive regions positioned under the thumbs and fingertips on the left and right paddles wherein the regions are not unintentionally activated while the paddles are manipulated to rock and to roll responsive to hand movements.

2. The apparatus in claim 1, further comprising a plurality of sensors including one or more of:
    an accelerometer to track movements of the entire apparatus and its orientation relative to the earth;
    a force sensor to track the pressure exerted by the user holding the apparatus between their hands;
    and left and right position sensors to track the rock and roll states of the left and right paddles relative to the tie bar.

3. The apparatus of claim 2, further comprising electronics comprised of power sources, controllers, and communications links to determine the state of the touch sensitive regions and read the embedded sensors to report inputs to a paired computer via a communication link.

4. The apparatus of claim 3, wherein the reported inputs include one or more of keyboard scan codes, pointer commands, and game controller commands.

5. The apparatus of claim 4, wherein the amount of pressure being applied determines whether keyboard scan codes or pointer commands are reported.

6. The apparatus of claim 4, wherein the movements of the paddles determine the reported pointer commands.

7. The apparatus of claim 6, wherein move left commands are reported when the left paddle rolls out or the right paddle rolls in and move right commands are reported when the left paddle rolls in or the right paddle rolls out, and wherein move up commands are reported when the left or right paddle rocks up and move down commands are reported when the left or right paddle rocks down.

8. The apparatus of claim 4, wherein the positions of the paddles is used to select a subset of the keys of a computer keyboard to assign to the touch sensitive regions on the paddles so the plurality of scan codes of a computer keyboard can be reported through the touch sensitive regions under the user's fingers and thumbs.

9. The apparatus of claim 8, wherein the current roll position of a paddle selects among the rows of a computer keyboard and the current rock position of a paddle selects among the keys within a row.

10. The apparatus of claim 8, wherein a diagram of keys can be shown on the display of a paired computer where the currently active keys responsive to the state of the embedded sensors are highlighted.

11. The apparatus of claim 3, wherein each paddle contains electronics that require only two wires to connect them to simplify getting through the pivots at the ends of the tie bar and the hinge in the middle of the tie bar, and wherein one of the signals is a ground connection and the other signal is time multiplexed between one or more of a power connection, a digital communication signal, and an analog signal output from the force sensor.

12. The apparatus of claim 3, wherein a paired computer such as a smart phone or tablet is attached to the tie bar.

13. The apparatus of claim 1, wherein the touch sensitive regions under the user's fingers are activated by pressing into the back of a paddle and the touch sensitive regions under the user's thumb are activated by pressing down on a paddle.

14. The apparatus of claim 1, wherein a hinge in the middle of the tie bar allows the apparatus to be folded in half when not in use for storage and transport.

15. The apparatus of claim 1, wherein a paddle can be split into a palm part and a finger part such that the palm and finger parts can be slid in and out relative to one another to accommodate smaller and larger hands, respectively.

16. The apparatus of claim 15, wherein the finger part can be pitched in relative to the palm part to position the keys to a user's preference, and wherein the palm-finger pitch is spring loaded so the paddles lay flat when the apparatus is folded in half.

17. A method of using a computer input device comprising:
holding the computer input device by pressing in on left and right paddles connected to a tie bar with left and right hands wherein the paddles are shaped to press into the palm on a line that runs along the metacarpal-phalangeal joints and extends to pass between the proximal phalanges of the index finger and thumb;
moving the left paddle relative to the tie bar by rotating around axes of a left 2-axis pivot connecting the left paddle to the tie bar and moving the right paddle relative to the tie bar by rotating around axes of a right 2-axis pivot connecting the right paddle to the tie bar;
rocking at least one of the paddles down by rotating around a first axis of one of the 2-axis pivots by pressing with the hand near the metacarpal-phalangeal joint of the index finger and rocking at least one of the paddles up by pressing with the hand near the metacarpal-phalangeal joint of the pinky finger;
rolling at least one of the paddles out by rotating around a second axis of one of the 2-axis pivots by pressing with the side of the thumb and rolling at least one of the paddles in by pressing with the palm;
and activating touch sensitive areas positioned under the user's fingertips and thumbs by pressing into the device with fingers and thumbs not otherwise needed for holding the device or manipulating the paddles.

18. The method in claim 17, further comprising one or more sensors to:
track the position of the paddles relative to the tie bar via position sensors;
track the force applied by the user holding the device between their hands using a force sensor;
track the movements of the device and its position relative to the earth using an accelerometer;
and track the state of the touch sensitive areas using key-switches or touch sensors.

19. The method of claim 18, wherein the current states of the sensors are interpreted to send keyboard inputs or pointer inputs or game controller inputs to a paired computer.

20. The method in claim 19, wherein the device provides inputs to a paired computer with a display monitor, to a paired computer with an integrated display, or to a paired computer with a display headset worn by the user.

21. The method of 20, wherein the display shows a map of the possible inputs available to be selected by activating touch sensitive areas and highlights the currently active subset of inputs based on the current state of the sensors.

\* \* \* \* \*